(12) United States Patent
Sankrithi et al.

(10) Patent No.: US 6,666,406 B2
(45) Date of Patent: Dec. 23, 2003

(54) BLENDED WING AND MULTIPLE-BODY AIRPLANE CONFIGURATION

(75) Inventors: Mithra M. K. V. Sankrithi, Federal Way, WA (US); Steven J. Wald, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/892,275

(22) Filed: Jun. 26, 2001

(65) Prior Publication Data
US 2002/0003190 A1 Jan. 10, 2002

Related U.S. Application Data

(60) Provisional application No. 60/215,371, filed on Jun. 29, 2000.

(51) Int. Cl.[7] .................................................. B64C 3/02
(52) U.S. Cl. ........................................ 244/36; 244/119
(58) Field of Search .............................. 244/36, 13, 25, 244/117 R, 35 R; D12/335, 336, 337

(56) References Cited

U.S. PATENT DOCUMENTS

| D103,289 S | * | 2/1937 | Wendt |
|---|---|---|---|
| D112,834 S | * | 1/1939 | De Seversky |
| 2,194,596 A | * | 3/1940 | Henter |
| 2,224,641 A | * | 12/1940 | Burnelli |
| D133,805 S | * | 9/1942 | Bierig |
| D138,469 S | * | 8/1944 | Eichman |
| 2,417,189 A | * | 3/1947 | Cornelius |
| D158,736 S | * | 5/1950 | Frank |
| 2,557,962 A | * | 6/1951 | Greene |
| 2,628,043 A | * | 2/1953 | Montgomery |
| 3,348,513 A | * | 10/1967 | Dishart |
| 3,869,102 A | * | 3/1975 | Carroll |
| RE35,387 E | * | 12/1996 | Strom |
| 5,893,535 A | * | 4/1999 | Hawley |
| 6,047,923 A | * | 4/2000 | Lafferty |

* cited by examiner

Primary Examiner—Tien Dinh
(74) Attorney, Agent, or Firm—Conrad O. Gardner

(57) ABSTRACT

A partial blended wing body airplane configuration combining the advantages of a pure blended wing configuration with the advantages of conventional aircraft design. A blended tri-body airplane configuration wherein three pressurized body elements are connected by and blended with a pressurized centerwing element. The sidebodies and centerbody are blended into the wing structure, producing a multi-body airplane whose body sections are interconnected utilizing wing payload carrying sections.

5 Claims, 10 Drawing Sheets

BLENDED WING AND MULTIPLE-BODY AIRPLANE CONFIGURATION

CROSS-REFERENCE TO RELATED APPLICATIONS

This application claims the benefit of U.S. Provisional Application No. 60/215,371, filed Jun. 29, 2000.

BACKGROUND OF THE INVENTION

1. Field of the Invention

The present invention relates to multiple-body aircraft and more particularly to a tri-body aircraft.

2. Description of the Prior Art

Patent Literature

U.S. Pat. No. 3,869,102 to Carroll, issued Mar. 4, 1975 is illustrative of a cargo aircraft having a non-pressurized hull which can comprise a number of substantially identical hull modules defining a rectangular cargo area.

U.S. Pat. No. 4,735,381 to Wood, issued Apr. 5, 1988 shows a multi-body aircraft with an all-moveable center fuselage which translates relative to two side fuselages without coupling between pressurized multi-body volumes.

Publications

American Institute of Aeronautics and Astronautics publication No. 98-0440 titled "An Airplane Configuration with an Inboard Wing Mounted Between Twin Fuselages, a paper provided at the 36$^{th}$ Aerospace Sciences Meeting & Exhibit Jan. 12–15 1998 at Reno, Nev. A wing is shown mounted between twin tip fuselages.

PROBLEM SOLVED BY THE PRESENT INVENTION

Future large airplanes, in order to be economically successful, should satisfy the following requirements:

1. Provide lower fuel burn per seat mile and lower Total Airplane Related Operating Costs (TAROC) per seat mile relative to current large aircraft viz. The Boeing 747.
2. Maximize cruise Lift to Drag ratio (L/D), to help enable lower fuel burn per seat mile.
3. Provide low wetted area per seat and low Overall Empty Weight (OEW) per seat, to help enable lower fuel bum per seat mile.
4. Provide large cabin volume per wetted area and large volume per wetted area, to maximize profit potential.
5. Provide combination use or "combi" capability to convert some passenger capacity to cargo capacity for some airlines for which revenue cargo is important and for which passenger seat count needs are not as large as for other airlines.
6. Provide a low to modest level of technical risk and certification risk.

BRIEF SUMMARY OF THE INVENTION

The present invention provides a blended wing multiple-body airplane comprising a plurality of fuselage elements which are aerodynamically and structurally blended with a connecting wing element which also carries payload. The wing body blending provides reduced wetted area, and span loading resulting in reduced OEW (Overall Empty Weight) per seat. Large loads are placed where lift is located. The present invention provides conventional flying qualities without need for critical SAS (Stability Augmentation Systems). Fuel burn reduction results from the hereinafter described 3 engines with no aft engine and less weight.

DETAILED DESCRIPTION OF THE INVENTION

Figure 1A:
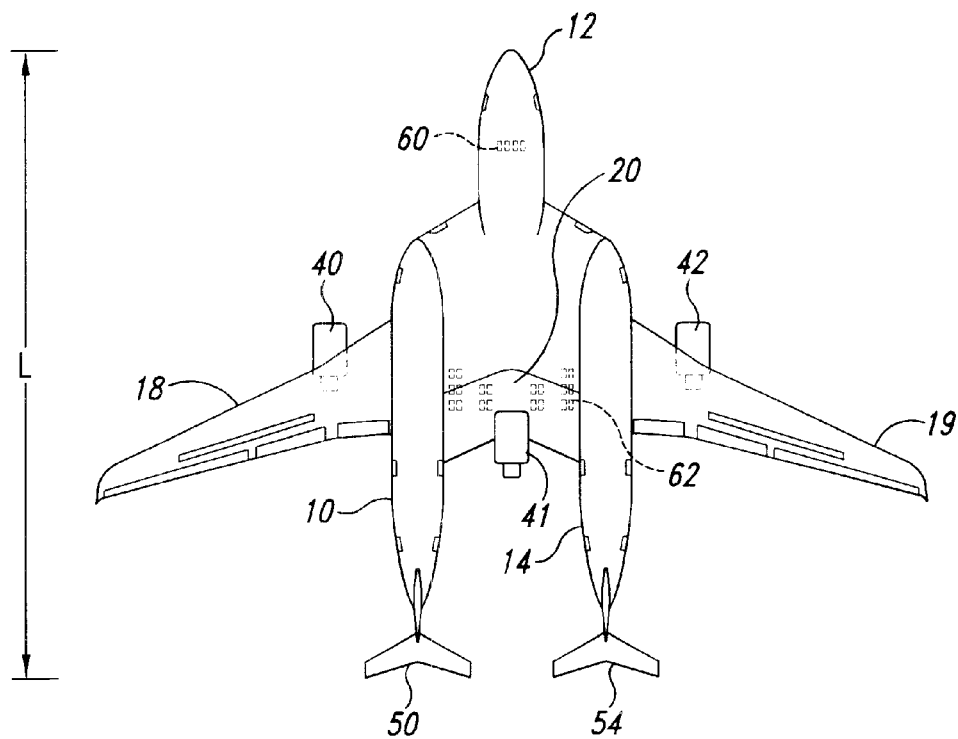
FIG. 1A is a plan view and FIG. 1B is a rear view of a blended tri-body airplane according to the present invention.
Figure 1B:
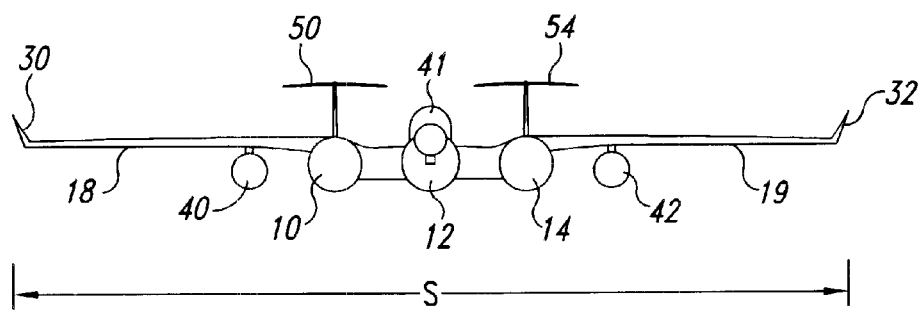

FIG. 1A is a plan view and FIG. 1B is a rear view of a preferred embodiment of the invention. This configuration features three pressurized body elements 10, 12, and 14 connected by and blended with a pressurized centerwing element 20 which also carries payload (e.g. passengers).In the forward body element comprising forebody 12 is a doubledeck body capable of providing two stacked passenger seating cabins, similar to the forward body of a Boeing Company model 747-400. Dual sidebodies 10 and 14 are single deck bodies similar to the body of Boeing Company model 777. An additional cargo carrying deck is provided in the lower lobe or lower deck areas beneath the passenger seating cabins in both forebody 12 and sidebodies 10 and 14. In alternative embodiments forebody 12 may include a single deck suitable for accommodating passengers instead of a double deck, and/or sidebodies 10 and 14 may have double decks suitable for accommodating passengers instead of single decks for that purpose. Also further embodiments may feature forebodies and sidebodies of various cross-sectional shapes and sizes, with passenger deck sizes ranging from 2 abreast to 20 abreast.

In the embodiment of FIG. 1, outerwings 18 and 20 are provided outboard of sidebodies 10 and 14. Outerwings 18 and 20 comprise state of the art airplane wings and may be high, mid, or low wings (high wings are shown for purposes of illustration). Outerwings 18 and 20 will typically operate at considerably higher lift coefficients than centerwing 20, but the span-wise distribution can still remain quite smooth since centerwing 20 has considerably more chord than outerwings 18 and 20. Aerodynamic fairing treatment provides aerodynamic smoothing from the outerwing flow region across the sidebody to the centerwing flow region. Winglets 30 and 32 or other wingtip aerodynamic induced drag reducing treatments may be provided at the outer ends of outer ends of outerwings 18 and 20 as shown. The embodiment shown has a preferred overall span S of around 261 ft., just under the 80 meter limit specified for the ICAO Code F airplane size category. An overall length L well under 80 meters is shown in FIG. 1, and "stretch" body versions may be utilized with increased payload (passenger and cargo) capacity which still fall within an 80 meter or 85 meter length limit. Such stretch body versions are provided by adding constant section fuselage plugs into forebody 12 just ahead of centerwing 20, and to sidebodies 10 and 14 just behind centerwing 20.

The blended tri-body airplane of FIGS. 1A and 1B may utilize fabrication materials such as metal, composite, or other materials or combinations of materials. Benefits may be achieved through utilization of stitched RFI composite structure for centerwing 20.

The airplane of FIGS. 1A and 1B is shown with "T-tail" empennage installations 50 and 54 above the aft ends of sidebodies 10 and 14 for contributing to airplane stability and control (trimmable stabilizer, elevator, and rudder means may be provided for trim and control prposes). Further variations may feature low tails, V-tails, and H-tail or inverted V-tail or other tail configurations connecting between sidebodies 10 and 14 or other tail configurations.

The airplane of FIG. 1A and FIG. 1B show a nose landing gear 60 which can retract into forebody 12, and main landing gear 62 which can retract into an unpressurized portion of centerwing 20 behind the pressurized portion. A 4-wheel single post nose gear and a 20-wheel, four post main gear are shown for purposes of illustration although other types of wheel and post gear arrangements can be utilized within the spirit and scope of the invention.

The airplane configuration of FIGS. 1A and 1B provides the dual benefits of low drag per seat (due to low wetted area per seat to reduce parasite drag and a large overall span to reduce induced drag) and low OEW per seat (due to low wetted area per seat and due to span load distribution of payloads in addition to engines and fuel).

Figure 2A:
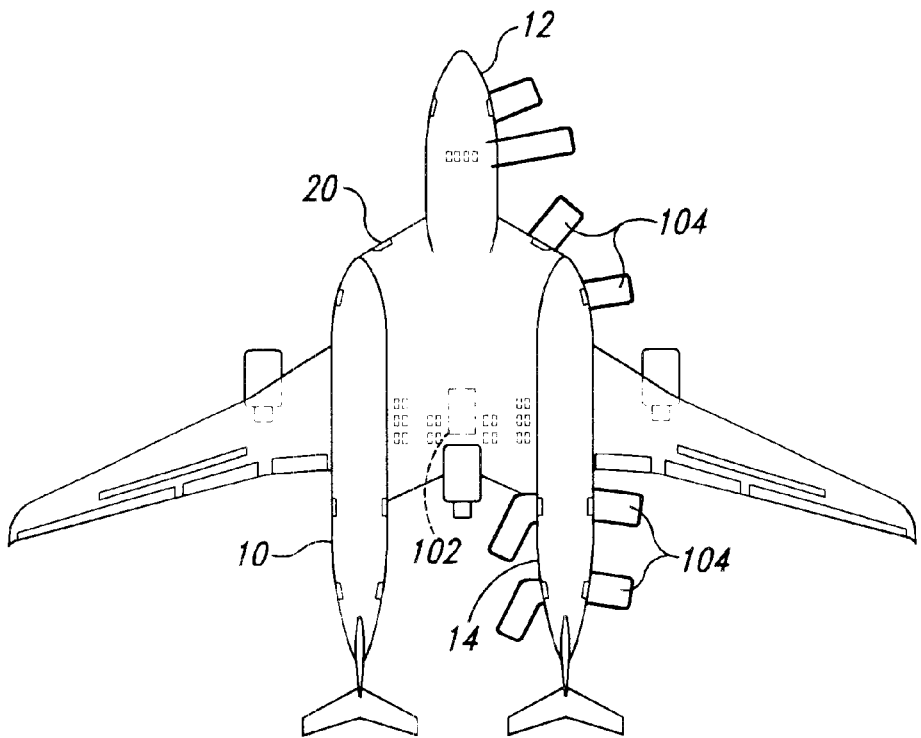
FIG. 2A is a plan view and FIG. 2B is a rear view is a door arrangement and evacuation slide arrangement for the blended tri-body airplane configuration shown in FIG. 1A and FIG. 1B.
Figure 2B:
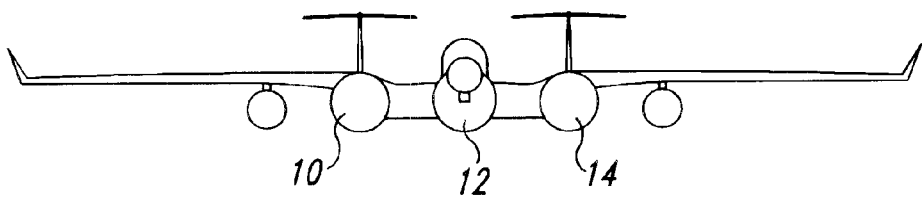

FIG. 2A is a plan view of a door and slide arrangement for the Airplane of FIG. 1A. The arrangement shown utilizes 8 pairs of type A doors (4 on each side) with slides or slide-rafts 104, and optionally one underbody slide 102 (or alternatively one underbody stairway). Assuming a limit of 110 passengers per pair of type A doors, the door exit limit capacity of this configuration should be 935 (or 880 even if no credit is taken for the underbody slide). The illustrated door arrangement is intended to meet the 60 ft. maximum longitudinal separation between door edges rule, and to enable safe evacuation of passengers from the airplane in the required 90 seconds. Alternate door arrangements and escape slide arrangements are possible within the spirit and scope of the invention.

Figure 3A:
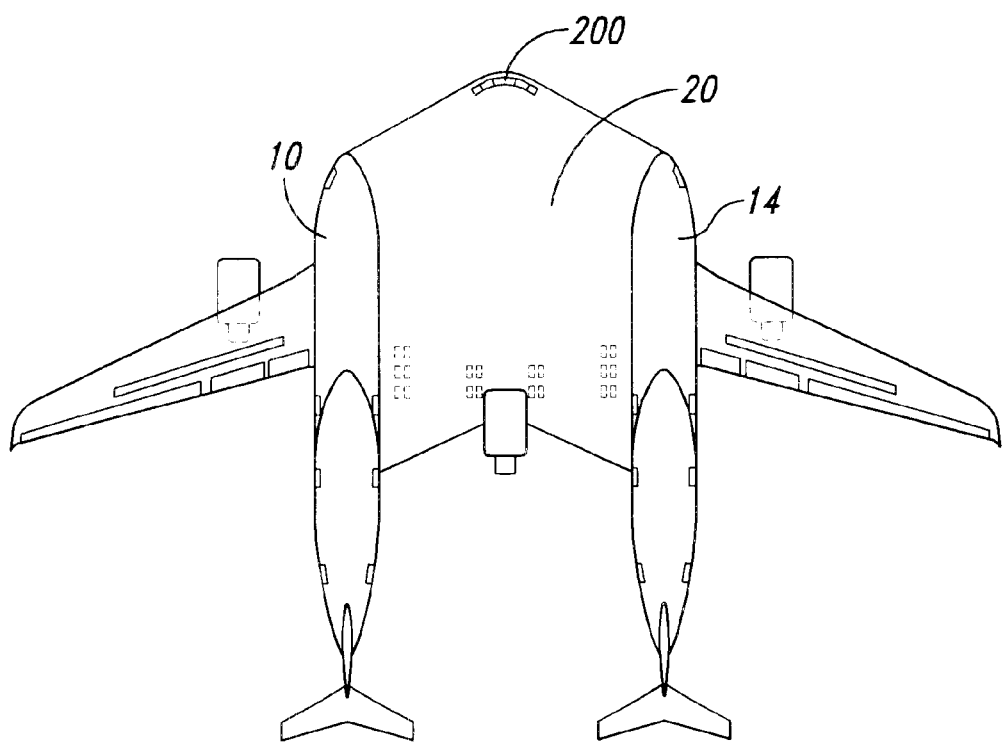
FIG. 3A is a plan view and FIG. 3B is a rear view of a dual-body configuration which is a variant of the airplane of FIG. 1A and FIG. 1B without forebody.
Figure 3B:
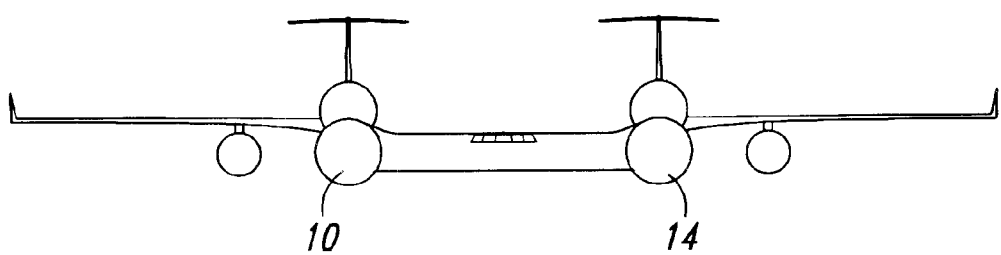

FIG. 3A is a plan view and FIG. 3B is a rear view of the aircraft of FIGS. 1A and 1B but without a forebody however retaining the aforementioned advantages of a blended wing mutiple-body airplane. A cockpit 200 is located in or near the forward apex of centerwing 20 or in the alternative in or near the forward end of a sidebody 10 or 14.

Figure 4A:
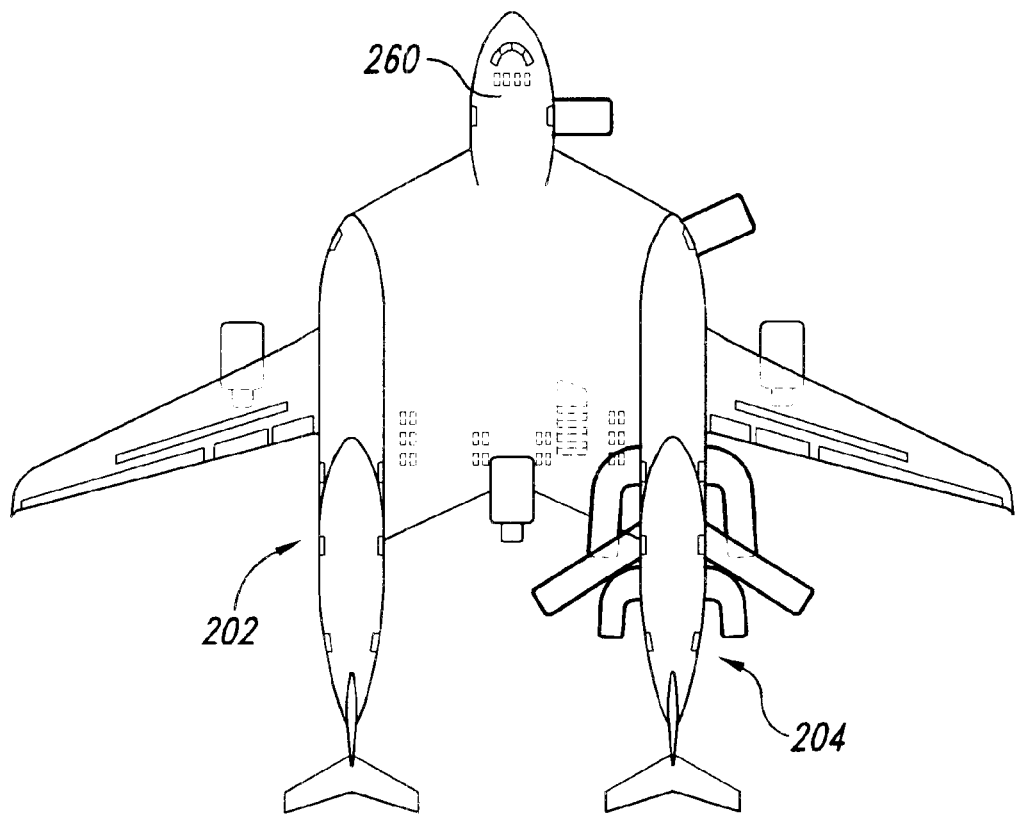
FIG. 4A is a plan view and FIG. 4B is a rear view of a second blended tri-body airplane differing from the embodiment of FIG. 1A and FIG. 1B comprising a single deck forebody and having double deck sidebodies.
Figure 4B:
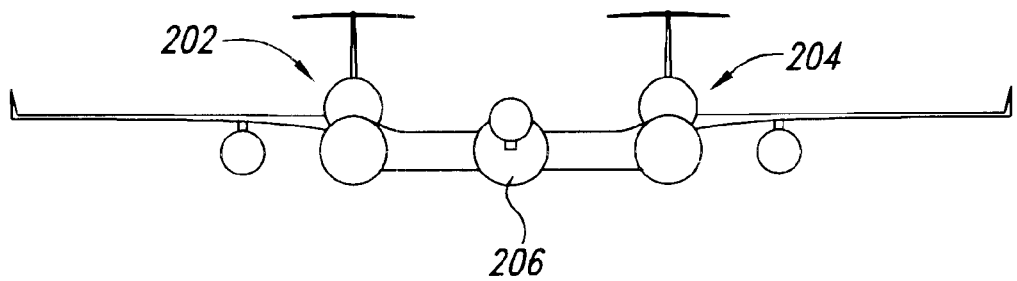

FIG. 4A is a plan view and FIG. 4B is a rear view of a second blended tri-body configuration. This configuration differs from the configuration of FIGS. 1A and 1B in several aspects including utilization of a single deck forebody 200 and aft double deck sidebodies 202 and 204.

Figure 5A:
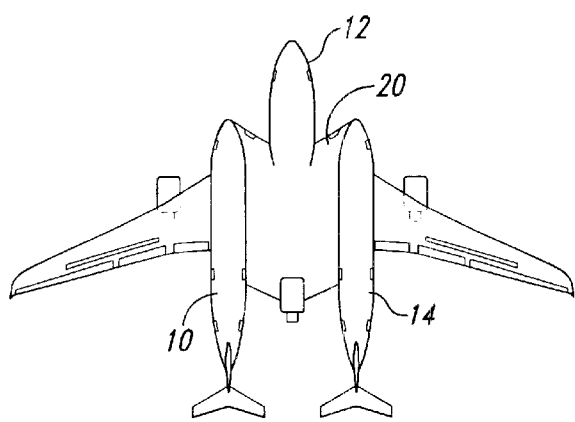
FIGS. 5A, 5B, and 5C and further
Figure 5B:
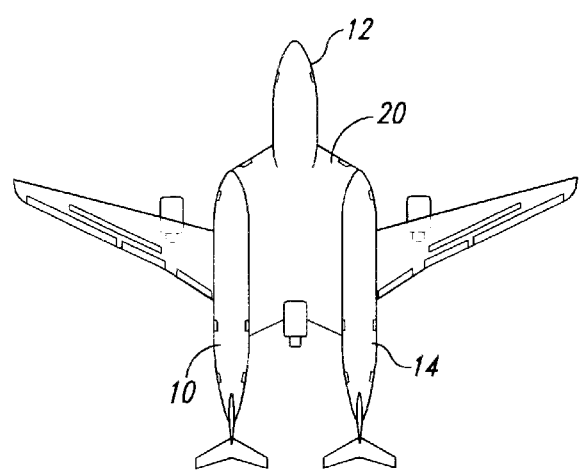
Figure 5C:
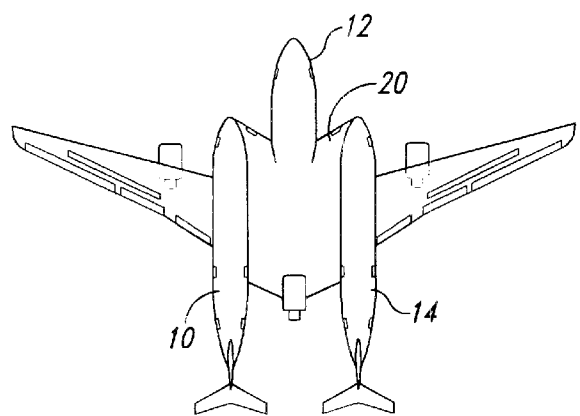
Figure 6A:
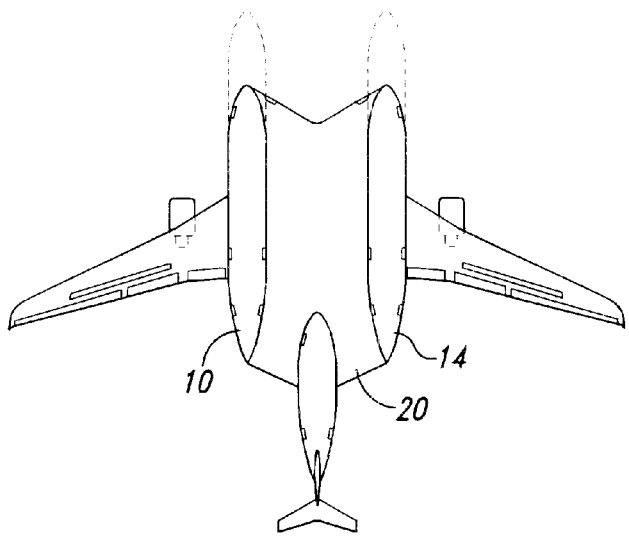
FIGS. 6A, 6B, and 6C show plan views which are further illustrative of further embodiments of blended tri-body airplanes.
Figure 6B:
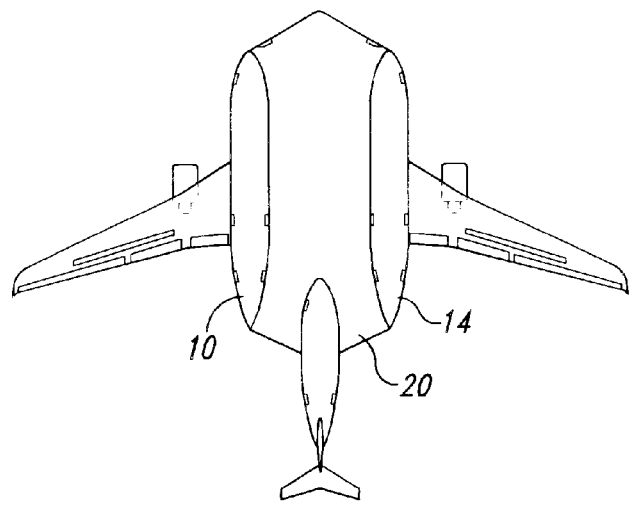
Figure 6C:
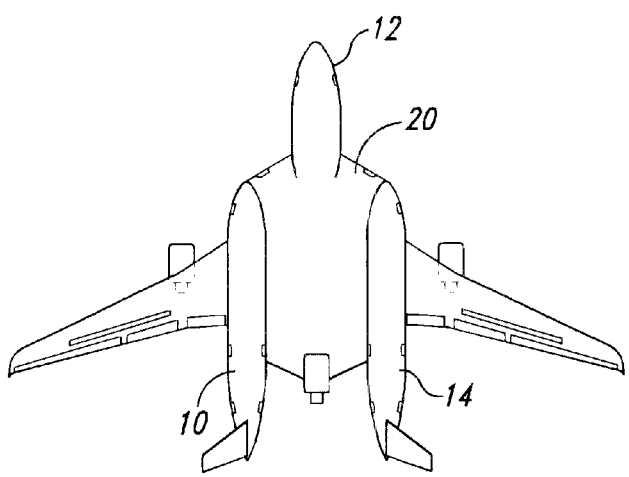

FIGS. 5A, 5B, and 5C and further FIGS. 6A, 6B, and 6C show plan views of features which are variants of the hereinbefore described blended wing multi-body airplanes and include:

swept-forward outerwings;

swept-forward centerwing;

centerwing with swept-aft leading edge and swept-forward trailing edge;

aftbody instead of forebody on the airplane centerline (i.e., centerbody behind instead of ahead of sidebodies);

extended body lengths;

several engines exceeding two; and, various tail/empennage configurations, including T-tails, split V-tails or low tails, an H-tail or inverted V-tail or further tail configurations connecting between the two sidebodies.

Figure 7A:
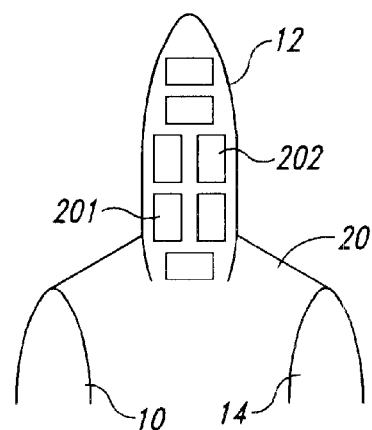
FIGS. 7A, 7B and 7C illustrate plan views of "combi" compartments which may be utilized in the hereinbefore described blended wing multi-body airplanes.
Figure 7B:
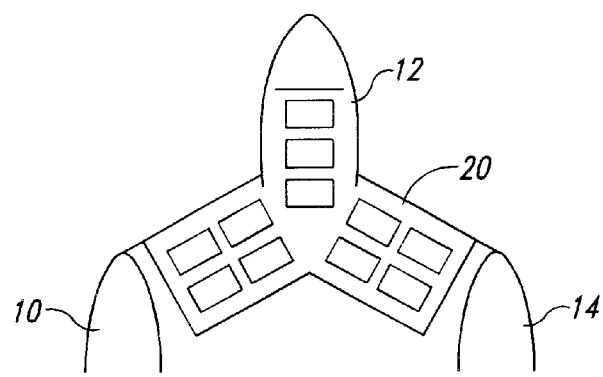
Figure 7C:
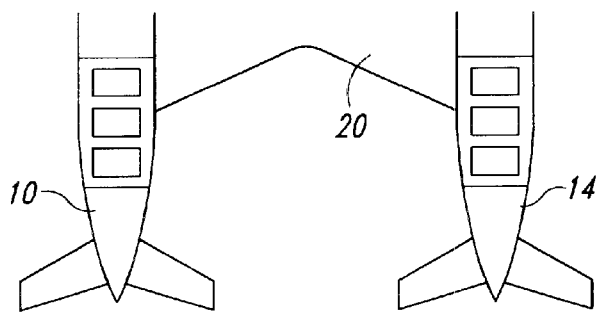
Figure 8A:
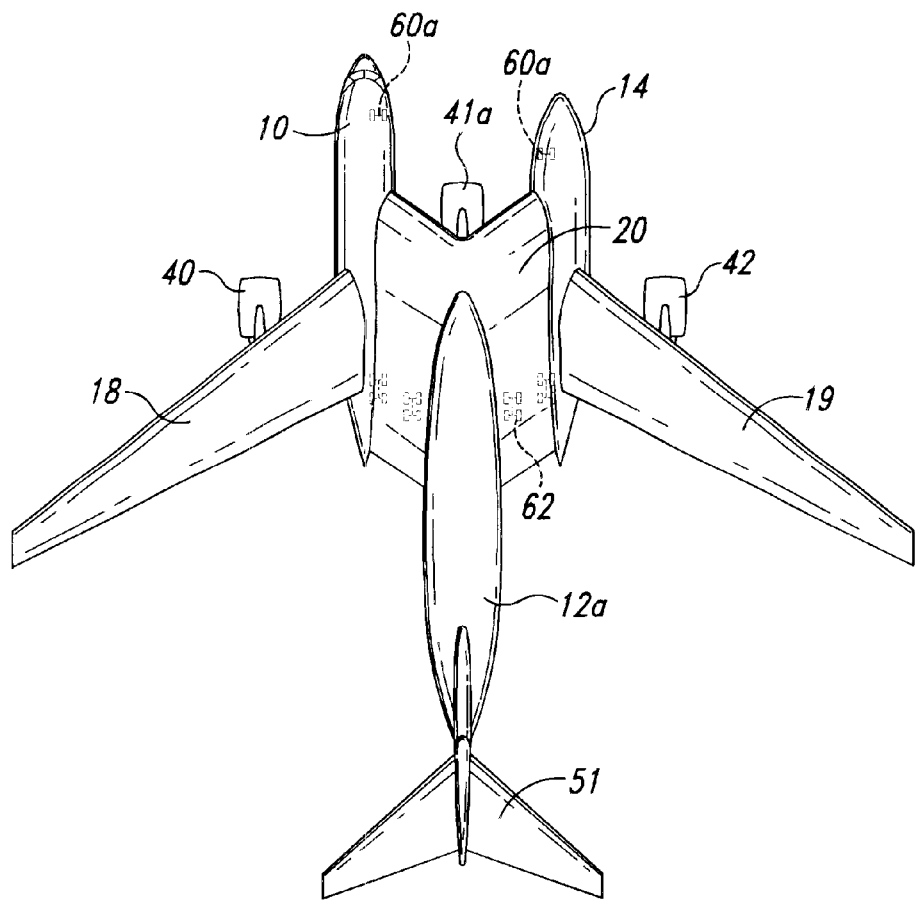
FIGS. 8A, 8B, 8C and 8DC illustrate plan, front, side and isometric views of yet another preferred embodiment of the invention; and, FIG. 9 illustrates a typical cabin interior arrangement for the embodiment show in FIG. 8.
Figure 8B:
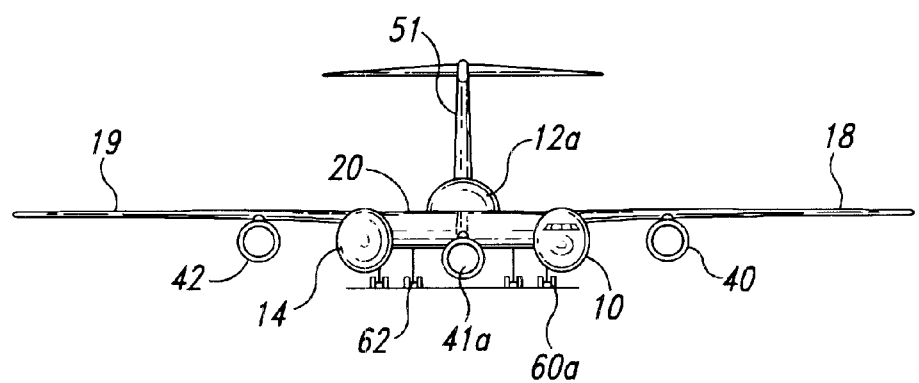
Figure 8C:
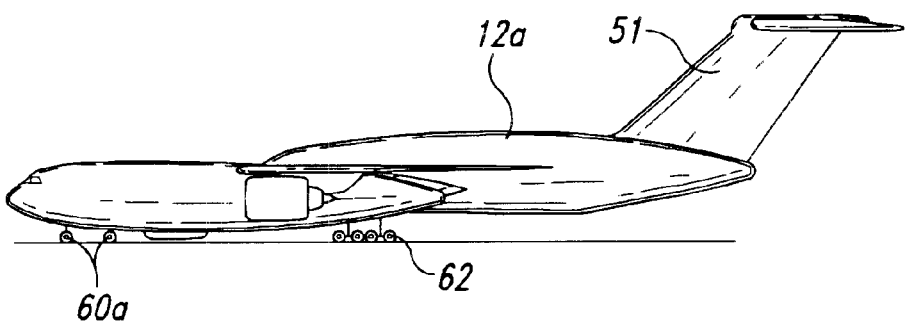
Figure 8D:
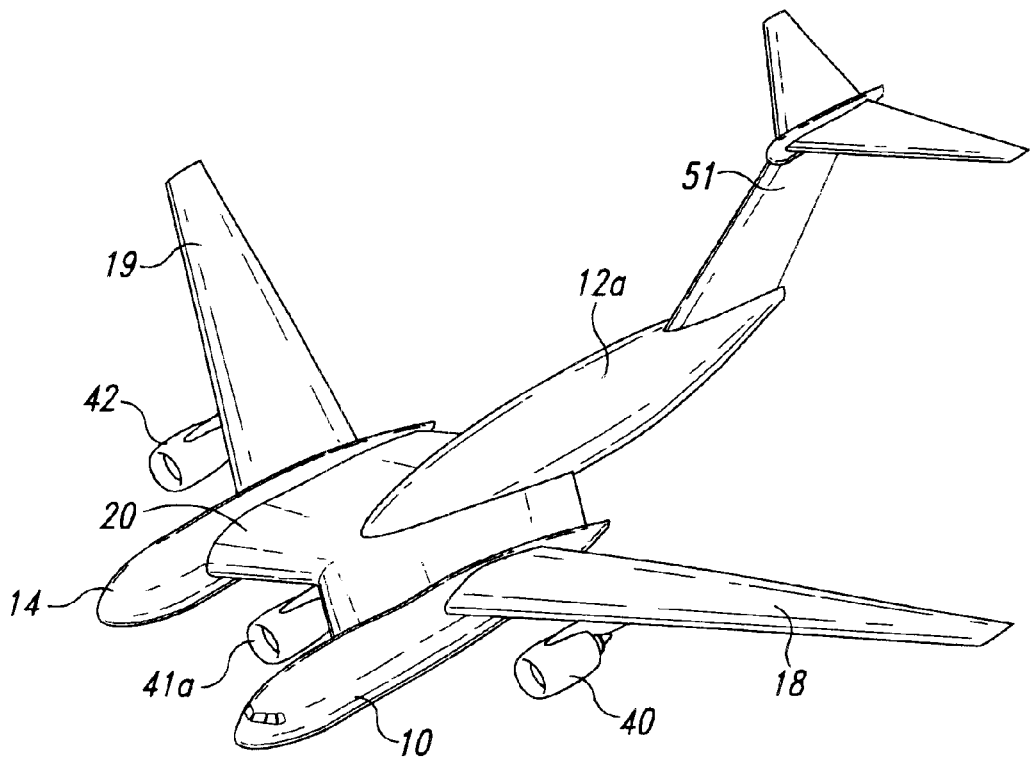
Figure 9:
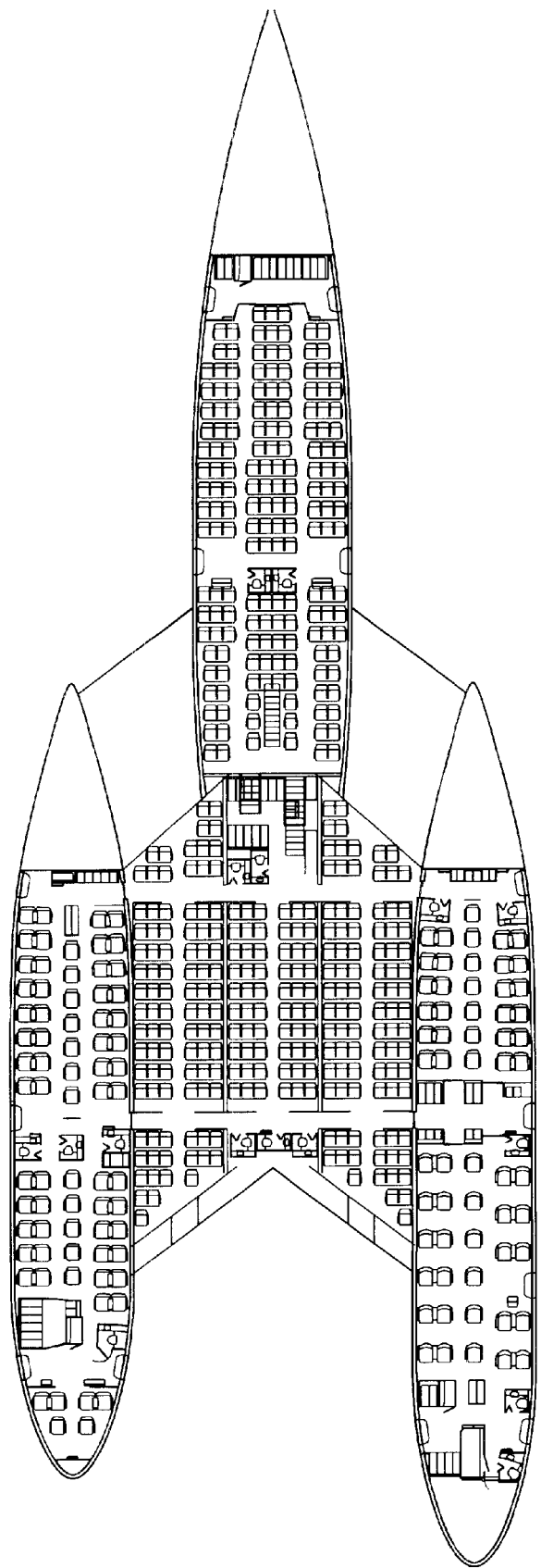

FIGS. 7A, 7B, and 7C are illustrative of plan views of "combi" compartments which may be utilized on the present blended wing multi-body airplane configuration, which compartments are suitable for carrying cargo in pallets e.g. 201 and 202 or which airplane may be converted back to passenger carrying configurations.

In the preferred embodiment of FIG. 8, sidebodies 10 and 14 are forward of and along the length of centerwing 20. Centerwing 20 has forward swept leading and trailing edges. Variations of the centerwing 20 sweep are forward swept leading edge with aft swept trailing edge, aft swept leading edge with forward swept trailing edge and aft swept leading and trailing edges. The cockpit is located in the forward section of one of the sidebodies 10 and 14.

Center engine 41a is shown mounted center and forward of centerwing 20 on a pylon. An alternative installation of center engine 41a is in the vertical tail structure similar to a McDonnell Douglas DC 10.

Aft body 12a is connected to centerwing 20 and extends aft to support the empennage. The interior of aft body 12a is connected to the pressurized section of centerwing 20 allowing the free movement of passengers. The cross section of 12a may consist of a single passenger deck with lower cargo deck or may consist of double passenger decks with lower cargo deck similar to a Boeing 747.

Nose landing gears 60a are shown in an unpressurized bay in each of sidebodies 10 and 14. Main landing gear 62 are attached to the structure of centerwing 20 and retract into unpressurized gear bays at the rear of centerwing 20.

While certain preferred embodiments of the invention have been described with reference to the attached figurers, it should be understood that further variations and modifications are possible within the spirit and scope of the invention as defined in the claims below:

What is claimed is:

1. A blended tri-body airplane configuration comprising in combination:

(i) an aft center body fuselage capable of carrying payload in a pressurized volume thereof, (ii) a tail surface means attached to the aft part of the aft center body fuselage, for controlling the airplane in the pitch and yaw axes, (iii) a forward-swept center wing attached at its aft apex region to the forward end of said aft center body fuselage, which center wing is capable of generating aerodynamic lift and of carrying payload in a pressurized volume thereof, (iv) a left side body fuselage attached to the left end region of said center wing and capable of carrying payload in a pressurized volume thereof, (v) a right side body fuselage attached to the right end region of said center wing and capable of carrying payload in a pressurized volume thereof, wherein the pressurized volumes of (i), (iii), (iv), and (v) are fluidly connected so that payload may be moved between the volumes without passing through any unpressurized portions of the aircraft.

2. The airplane configuration of claim 1 wherein the tail surface means comprises a T-tail.

3. The airplane configuration claim 1, further comprising left and right outer wings attached respectively to the outboard sides of said left and right side body fuselages.

4. The airplane configuration of claim 3, further comprising at least two engines attached by strut means to the center wing at positions outboard of the left and right side body fuselages.

5. The airplane configuration of claim 1, further comprising an engine attached by strut means to the forward end of the center wing.

\* \* \* \* \*